United States Patent [19]

Smithwick, Jr.

[11] 3,856,848

[45] Dec. 24, 1974

[54] PROCESS FOR PREPARING A PROTECTED ARGININE

[75] Inventor: Edward L. Smithwick, Jr., Indianapolis, Ind.

[73] Assignee: Eli Lilly and Compnay, Indianapolis, Ind.

[22] Filed: Dec. 26, 1973

[21] Appl. No.: 427,971

[52] U.S. Cl. ... 260/482 C, 260/112.5, 260/448.2 E, 260/448.2 N, 260/471 C
[51] Int. Cl. .......................................... C07c 129/08
[58] Field of Search ...................... 260/482 C, 471 C

[56] References Cited
UNITED STATES PATENTS
3,388,113   7/1968   Guttmann et al. .............. 260/482 C OTHER PUBLICATIONS
Pierce, A. E., Silylation of Organic Cmpds., Pierce Chem. Co., Rockford, Ill., pp. 22 ff, 1968.

Patai, S. adt., The Chem. of the Amino Group, Interscience, p. 691, 1968.

Primary Examiner—Lorraine A. Weinberger
Assistant Examiner—Paul J. Killos
Attorney, Agent, or Firm—William C. Martens, Jr.; Everet F. Smith

[57] ABSTRACT

An $N^\alpha$, $N^G$, $N^G$-trisubstituted arginine is prepared by treating arginine with a benzyl carbonate or a p-methoxy-benzyl carbonate in the presence of a silylating agent and an amide solvent, and treating the resulting product with a lithium salt of an acid having a pK of from about 4 to about 6 and in the presence of an alcohol.

8 Claims, No Drawings

PROCESS FOR PREPARING A PROTECTED ARGININE

BACKGROUND OF THE INVENTION

The guanidino function present in arginine, due to its high pK, poses special problems in peptide synthesis. Frequently, the method of choice for protection of the arginine guanidino moiety in a synthetic peptide strategy simply involves protonation of the guanidine residue. However, the presence of a protonated guanidine residue in peptides containing an arginine moiety can confer to the peptide undesirable physical characteristics such as detrimental solubility and ion-exchange properties. Therefore, many times it is necessary to protect the guanidino function by a masking group which subsequently can be removed.

Among these guanidino protected arginine derivatives are $N^G$-nitroarginine, $N^G$-tosylarginine, $N^G,N^G$-di-p-methoxybenzyloxycarbonylarginine and $N^G,N^G$-dibenzyloxycarbonylarginine. In any of these derivatives the α-amino function can be protected with any of a wide variety of nitrogen protecting groups.

Of the protected arginine derivatives, $N^G,N^G$-dibenzyloxycarbonylarginine and $N^G,N^G$-di-p-methoxybenzyloxycarbonylarginine, having the α-amino function suitably protected have proven to be especially valuable intermediates for the incorporation of an N-terminal arginine residue into a peptide. Particularly is this true with respect to $N^\alpha,N^G,N^G$-tribenzyloxycarbonylarginine and $N^\alpha,N^G,N^G$-tri-p-methoxybenzyloxycarbonylarginine. Heretofore, the methods available for preparing an $N^\alpha$-substituted-$N^G,N^G$-dibenzyloxycarbonylarginine or an $N^\alpha$-substituted-$N^G,N^G$-di-p-methoxybenzyloxycarbonylarginine structure have been both cumbersome and less than adequate in terms of product yield.

The method generally employed in preparing $N^\alpha,N^G,N^G$-tribenzyloxycarbonylarginine is that described in Zervas et al., *J. Org. Chem.*, 22, 1515 (1957). This method involves treating arginine with benzyloxycarbonyl chloride in a strongly alkaline medium. The method gives rise to the production of a mixture of at least two different isomeric forms of the sodium salt of tribenzyloxycarbonylarginine. Separation of a stable form of the sodium salt of tribenzyloxycarbonylarginine from the mixture is achieved by decomposition of the unstable portion of the product mixture to form $N^\alpha,N^G$-dibenzyloxycarbonylarginine by treatment of the mixture with boiling ethanol. The method thereby defined involves several cumbersome steps and leads to production of the desired stable tribenzyloxycarbonylarginine in, at best, poor yield. This method also is discussed in general terms in two recognized peptide texts, namely, Greenstein and Winitz, *Chemistry of the Amino Acids*, Volume 2, New York, Wiley (1961), pp. 1,068–1,077; and Schroder and Lubke, *The Peptides*, Volume 1, New York, Academic Press (1965–1966), pp. 172–174.

This invention is directed to a process for preparing a protected arginine. It can be carried out in a more facile manner than that previously available, and it provides product yields greater than those previously found to be obtainable. The products obtainable by the process of this invention include $N^\alpha,N^G,N^G$-tribenzyloxycarbonylarginine and $N^\alpha,N^G,N^G$-tri-p-methoxybenzyloxycarbonylarginine as well as other $N^\alpha$-substituted-$N^G,N^G$-dibenzyloxycarbonylarginines and $N^\alpha$-substituted-$N^G,N^G$-di-p-methoxybenzyloxycarbonylarginines. These stable, protected arginines are available in accordance with the process of this invention in excellent purity and yield.

SUMMARY OF THE INVENTION

This invention is directed to a process for preparing a protected arginine of the formula

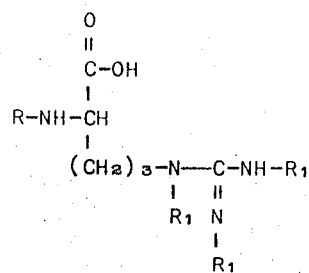

in which R is benzyloxycarbonyl, benzoyl, p-methoxybenzyloxycarbonyl, p-nitrobenzyloxycarbonyl, or t-butoxycarbonyl, and one $R_1$ is hydrogen and the other two are benzyloxycarbonyl, or p-methoxybenzyloxycarbonyl, which comprises (a) treating an arginine of the formula

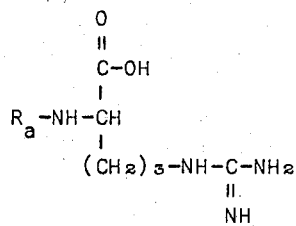

in which $R_a$ is hydrogen, benzyloxycarbonyl, benzoyl, p-methoxybenzyloxycarbonyl, p-nitrobenzyloxycarbonyl, or t-butoxycarbonyl, in an N,N-disubstituted amide solvent with a compound of the formula

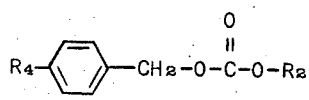

in which $R_2$ is pentachlorophenyl, 2,4,5-trichlorophenyl, or p-nitrophenyl, and $R_4$ is hydrogen or methoxy, at a temperature of from about 40°C. to about 90°C. for from about 12 to about 72 hours and in the presence of an amide structured silylating agent, and (b) treating the resulting $N^G$-protected arginine derivative with at least about 4 molar equivalents of a lithium salt of an acid having a pK of from about 4 to about 6 in the presence of an alcohol of the formula $R_3OH$ in which $R_3$ is a $C_1$ to $C_6$ alkyl to produce said protected arginine in the form of its lithium salt.

DETAILED DESCRIPTION OF THE INVENTION

The protected arginine produced by the process of this invention has the formula

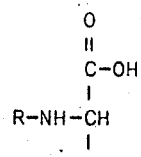

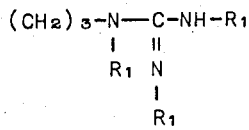

In the above formula R is benzyloxycarbonyl, benzoyl, p-methoxybenzyloxycarbonyl, p-nitrobenzyloxycarbonyl, or t-butoxycarbonyl. One of the three $R_1$ groups present in the above structure is hydrogen and the other two are the same and are benzyloxycarbonyl or p-methoxybenzyloxycarbonyl. No greater structural specificity of the ultimate product available from the process of this invention is possible since the position of the substituents at the nitrogens of the guanidino functions has not been established. It is believed, however, that the benzyloxycarbonyl or p-methoxybenzyloxycarbonyl groups are represented by the two $R_1$ substituents present at the guanidino nitrogens to which the remainder of the amino acid molecule is not attached. Preferably, two of the three $R_1$ substituents are benzyloxycarbonyl.

In accordance with the process of this invention, the product which is produced is recovered in the form of its lithium salt. The lithium salt can be readily converted to the defined free acid structure by subjecting the lithium salt to a dilute acid medium, a general technique well recognized in the chemical arts.

The R group present at the α-amino function of the resulting protected arginine is determined by the structure of the starting material. That is, in those instances in which the $R_a$ substituent of the starting material is benzoyl, benzyloxycarbonyl, p-methoxybenzyloxycarbonyl, p-nitrobenzyloxycarbonyl, or t-butoxycarbonyl, the R substituent of the product will be identical to $R_a$. In those instances in which $R_a$ is hydrogen, and, therefore, the α-amino group is not protected, R of the resulting product will be a benzyloxycarbonyl or a p-methoxybenzyloxycarbonyl function.

The process of this invention generally can be divided into two stages. First, the arginine molecule, employed in the form of its free acid, is treated both with a specifically-defined carbonate structured so as to afford a benzyloxycarbonyl or p-methoxybenzyloxycarbonyl function and with an amide structured silylating agent.

The carbonates which can be employed include benzyl pentachlorophenylcarbonate, benzyl 2,4,5-trichlorophenylcarbonate, benzyl p-nitrophenylcarbonate, p-methoxybenzyl pentachlorophenylcarbonate, p-methoxybenzyl 2,4,5-trichlorophenylcarbonate, and p-methoxybenzyl p-nitrophenylcarbonate. Preferably, the carbonate is benzyl or p-methoxybenzyl pentachlorophenylcarbonate, and most preferably, benzyl pentachlorophenylcarbonate. Any of these are sufficiently active chemically to introduce the benzyloxycarbonyl or p-methoxybenzyloxycarbonyl moiety present in their structure into the arginine molecule by displacement of an amine hydrogen.

By the term "amide structured silylating agent" is intended an agent which exists in the form of an amide and which can readily generate a silyl function that will react with the arginine. Typically, the silyl function which is generated from the silylating agent is the trimethylsilyl function. However, the process of this invention is not limited to employment of a trimethylsilyl function. Other trialkyl functions can be employed, including, for example, triethylsilyl, tripropylsilyl, and the like, as well as triphenylsilyl. Typical such silylating agents which can be employed include, for example, N-trimethylsilylacetamide N,O-bistrimethylsilylacetamide, N,O-bis-trimethylsilyltrifluoroacetamide, and the like. The silylating agent preferably is N-trimethylsilylacetamide or N,O-bis-trimethylsilylacetamide, and, most preferably, N-trimethylsilylacetamide.

The reaction of the arginine with the carbonate and the silylating agent is best carried out in the presence of a N,N-disubstituted amide solvent. Typical such solvents include, for example, N,N-dimethylformamide, N,N-dimethylacetamide, N,N-diethylformamide, N,N-diethylacetamide, and the like.

The first stage of the process of this invention preferably is carried out by mixing the arginine starting material in a suitable amount of the amide solvent. Generally, one liter of the amide solvent will be employed for each 0.1 to 5 moles of the arginine, and, preferably, from about 0.3 to about 0.8 moles of the arginine will be present for each liter of the amide solvent. Best results are obtained when care is exercised to assume the presence in the reaction mixture of no more than a minimal quantity of water. Preferably, therefore, the reaction is carried out under anhydrous or nearly anhydrous conditions.

Generally, the carbonate reagent will be added to the mixture of the arginine in the amide solvent. However, the carbonate can be added to the amide solvent simultaneously with the arginine, or the arginine can be added to the solvent already containing the carbonate. The carbonate reagent supplies the benzyloxycarbonyl or the p-methoxybenzyloxycarbonyl function. Therefore, the amount which is required will depend upon the number of benzyloxycarbonyl or p-methoxybenzyloxycarbonyl functions which are to be added to the arginine. When the arginine starting material already contains a substituent of the α-amino group, only two moles of the carbonate reagent will be required per mole of the arginine whereas three moles of the carbonate reagent will be required in those cases in which the arginine contains a free amino function at the α-position. Generally, only a slight or moderate excess of the carbonate will be employed over that required for reaction. A large excess of the carbonate does not improve the reaction; in fact, it can be disadvantageous since it is costly and is difficultly removable from the product mixture. Thus, from about 5 to about 15 % excess on a molar basis of the carbonate relative to the arginine generally will be employed.

The silylating agent which is employed serves a two-fold purpose. First, the silyl function displaces the hydrogen on the carboxyl of the arginine molecule. Secondly, the silylating agent is employed to tie up and inactivate the phenolic by-product which is liberated upon reaction of the carbonate with the arginine. Depending upon the particular carbonate which is employed, the phenolic by-product can be pentachlorophenol, 2,4,5-trichlorophenol, p-nitrophenyl, or the like. In any event, the silylating agent ties up and inactivates this phenolic by-product. Thus, it is necessary to employ sufficient silylating agent to displace the hydrogen of the carboxyl function of the arginine molecule and to tie up each of the phenolic moieties liberated during reaction of the carbonate with the arginine. Indirectly, therefore, the amount of silylating agent required is dependent upon the number of benzyloxycarbonyl or p-methoxybenzyloxycarbonyl groups added to the arginine molecule. If only two such groups are added, it will be necessary to employ sufficient silylating agent to provide three silyl groups per each arginine molecule, and if three are added, it will be necessary to employ sufficient silylating agent to provide four silyl groups. Assuming, therefore, that the silylating agent which is used generates a single silyl function per molecule, at least 3 or 4 moles of the silylating agent will be required per mole of the arginine. Certain silylating agents, however, generate two silyl functions per molecule. Commensurately less silylating agent will be required when such an agent is employed. Normally, sufficient silylating agent to react with each of the hereinbefore described reactive functionalities will be sufficient. However, a slight to moderate excess of the silylating agent normally will be employed, generally, from about 5 to about 30% on an equivalent weight basis.

As mentioned hereinbefore, the order of introduction to the solvent of reactants, that is, the arginine, the carbonate, and the silylating agent, is not important. Any order can be employed. However, generally, the arginine and the carbonate are first added to the solvent, and the resulting mixture is heated to the desired reaction temperature. Once the reaction temperature has been reached, the silylating agent is added.

The temperature of reaction of the first stage of the process of this invention generally is from about 40°C. to about 70°C., with from about 60°C. to about 65°C. being especially preferred.

At this moderately low temperature of reaction, the time required for completion is relatively long, generally from about 12 to about 72 hours. Preferably, the reaction will be completed within from about 24 to about 60 hours when the reaction temperature is maintained within the preferred range of from about 60°C. to about 65°C.

The second stage of the process of this invention involves treating the reaction mixture simultaneously with a lithium salt and an alcohol. The lithium salt which is employed must be the salt of a relatively weak acid, specifically, an acid having a pK of from about 4 to about 6. Typically, such lithium salts include, for example, lithium stearate, lithium acetate, lithium propionate, lithium heptanoate, and the like. Preferably, the lithium salt is lithium acetate.

The lithium salt is employed generally for two purposes. First, it converts the product intermediate to the form of its lithium salt, and secondly, it serves to salt out the product from reaction mixture. In view of the latter purpose, it is necessary to employ an excess of the lithium salt, generally at least four times, on a molar basis, relative to the arginine present in the reaction mixture. Preferably, a large excess of the lithium salt is employed, namely, at least about 10 moles per mole of the arginine present in the reaction mixture. More preferably, from about 10 to about 20 moles of the lithium salt are used per mole of the arginine product.

Treatment with the lithium salt is carried out in the presence of an alcohol, generally having the structure $R_3OH$ in which $R_3$ is a $C_1$ to $C_6$ alkyl group. The alcohol is employed to decompose any unstable by-product which may have formed during the reaction. The alcohol generally is employed in large excess, the upper limit being dependent only upon economic considerations and the physical limitations of the reaction system.

Typical alcohols include, for example, methanol, ethanol, n-propanol, isopropyl alcohol, n-butanol, isobutyl alcohol, t-butyl alcohol, pentanol, hexanol, and the like. Preferably, the alcohol which is employed is methanol or ethanol.

The reaction mixture, containing the product, lithium salt, and the alcohol, is treated at a temperature of from about 50°C. to about 85°C., and, preferably, from about 60°C. to about 80°C. Under these conditions, any unstable product which may have formed is decomposed, and the lithium salt of the desired product is formed. When the resulting reaction mixture is cooled, the lithium salt of the desired protected arginine, being insoluble, precipitates and is collected by filtration.

The resulting collected product generally is pure enough for further use either as is or in the form of its free acid. Otherwise, if necessary, it can be further purified by recrystallization from common solvents to obtain a product of high purity.

Protected arginines available from the process of this invention include, for example, $N^\alpha$,$N^G$,$N^G$-tribenzyloxycarbonyl-L-arginine, $N^\alpha$-benzoyl-$N^G$,$N^G$-dibenzyloxycarbonyl-L-arginine, $N^\alpha$,(p-methoxybenzyloxycarbonyl)-$N^G$,$N^G$-dibenzyloxycarbonyl-L-arginine, $N^\alpha$-(p-nitrobenzyloxycarbonyl)-$N^G$,$N^G$-dibenzyloxycarbonyl-L-arginine, $N^\alpha$-(t-butoxycarbonyl)-$N^G$,$N^G$-dibenzyloxycarbonyl-L-arginine, $N^\alpha$,$N^G$,$N^G$-tri-p-methoxybenzyloxycarbonyl-L-arginine, $N^\alpha$-benzoyl-$N^G$,$N^G$-di-p-methoxybenzyloxycarbonyl-L-arginine, $N^\alpha$-benzyloxycarbonyl-$N^G$,$N^G$-di-p-methoxybenzyloxycarbonyl-L-arginine, $N^\alpha$-(p-nitrobenzyloxycarbonyl)-$N^G$,$N^G$-di-p-methoxybenzyloxycarbonyl-L-arginine, $N^\alpha$-(t-butoxycarbonyl)-$N^G$,$N^G$-di-p-methoxybenzyloxycarbonyl-L-arginine, and the like. The above protected arginines are named in the form of their free acids. The products of the process of this invention are recovered in the form of their lithium salt; they can, by recognized procedures, be converted to the above corresponding free acid form.

As already mentioned hereinabove, the protected arginines which are available in accordance with the process of this invention are those which are recognized as highly useful in the synthesis of peptides containing arginine as one or more of their amino acid residues. Typical such peptides include, for example, glucagon, luteinizing hormone release hormone (LH-RH), and the like.

The following examples are provided to illustrate the process of this invention; however, they are not intended to be limiting upon the general scope thereof.

EXAMPLE 1

$N^\alpha$,$N^G$,$N^G$-tribenzyloxycarbonyl-L-arginine, lithium salt

To 210 ml. of dry N,N-dimethylformamide were added 20.88 g. (0.12 mole) of L-arginine and 160 g. (0.4 mole) of benzyl pentachlorophenylcarbonate. The resulting suspension was stirred and heated to 60°C. N-Trimethylsilylacetamide (78.6 g.; 0.6 mole) was added to the mixture, and the mixture was stirred for about 60 hours at about 60°C.

About 20 ml. of water were then added to the reaction mixture, and the N,N-dimethylformamide was removed by evaporation in vacuo. The resulting residue was dissolved in absolute ethanol, and the solution was added to a hot saturated solution of 50 g. of lithium acetate in ethanol. The resulting mixture was cooled slowly to room temperature and then maintained at about 4°C. overnight. A precipitate formed and was filtered. The collected solid was triturated with hot ethyl acetate and then was recrystallized from a minimum volume of boiling methanol. The solid was recovered by filtration and dried in vacuo to obtain 39 g. (56% yield) of the title compound, melting point 153°–155°C. An analytical sample was recrystallized from a mixture of methanol and acetone, melting point 156°–157°C. $[\alpha]_D^{24}$ +10.6—(C. 1.5, methanol).

Analysis Calcd. for $C_{30}H_{31}N_4O_8Li$ (M.W. 582.52): C, 61.85; H, 5.36; N, 9.62

Found: C, 61.75; H, 5.50; N, 9.34.

EXAMPLE 2

$N^\alpha$,$N^G$,$N^G$-tribenzyloxycarbonyl-L-arginine $N^\alpha$,$N^G$,$N^G$-tribenzyloxycarbonyl-L-arginine, lithium salt (10.0 g.; 0.017 mole), was suspended in ethyl acetate. The suspension was neutralized by addition of 2% aqueous sulfuric acid. The ethyl acetate layer was separated, dried over magnesium sulfate and evaporated in vacuo. The resulting residue was recrystallized from ethyl acetate to afford, after drying in vacuo, 9.1 g. (92% yield) of the title compound, melting point 138°–139°C. $[\alpha]_D^{25}$ +15.1 (C. 1.5, chloroform).

Analysis Calcd. for $C_{30}H_{32}N_4O_8$ (M.W. 576): C, 62.49; H, 5.59; N, 9.72

Found: C, 62.21; H, 5.80; N, 9.43.

EXAMPLE 3

$N^\alpha$-p-methoxybenzyloxycarbonyl-$N^G$,$N^G$-dibenzyloxycarbonyl-L-arginine, lithium salt To 200 ml. of dry N,N-dimethylformamide were added 48 g. (0.142 mole) of $N^\alpha$-p-methoxybenzyloxycarbonyl-L-arginine and 119 g. (0.284 mole) of benzyl pentachlorophenylcarbonate. The resulting suspension was stirred and heated to 60°C. N-Trimethylsylylacetamide (75 g.; 0.568 mole) was added to the reaction mixture, and stirring was continued for 34 hours at 60°C.

About 20 ml. of water was then added to the reaction mixture, and the N,N-dimethylformamide was removed by evaporation in vacuo. The resulting residue was dissolved in absolute ethanol, and the solution was then added to a hot solution of 50 g. of lithium acetate in 200 ml. of ethanol. The resulting solution was cooled to room temperature and then was maintained at about 4°C. overnight. The resulting precipitate was collected and triturated with hot ethyl acetate. The solid was then suspended in 600 ml. of hot methanol and refluxed for 20 minutes. The mixture was cooled overnight, filtered, and the collected solid was dried in vacuo, to afford 52 g. (63% yield) of the title compound, melting point 209°–210°C. $[a]_D^{24}$ +9.9 (C. 1.5, methanol).

Analysis Calcd. for $C_{31}H_{33}N_4O_9Li$ (M.W. 612.55): C, 60.78; H, 5.43; N, 9.15

Found: C, 60.51; H, 5.67; N, 9.08.

EXAMPLE 4

$N^a$-p-methoxybenzyloxycarbonyl-$N^G$,$N^G$-dibenzyloxycarbonyl-L-arginine $N^a$-p-methoxybenzyloxycarbonyl-$N^G$,$N^G$-dibenzyloxycarbonyl-L-arginine, lithium salt (10.0 g.; 0.0163 mole), was suspended in ethyl acetate. The suspension was extracted twice with 0.75 N aqueous citric acid. The ethyl acetate solution was washed with water, dried over magnesium sulfate, and evaporated in vacuo to afford 9.0 g. (91% yield) of the title compound, melting point 139°–141°C. $[\alpha]_D^{25}$ + 16.6 (C. 1.5, chloroform).

Analysis Calcd. for $C_{31}H_{34}N_4O_9$ (M.W. 606.63): C, 61.38; H, 5.65; N, 9.24

Found: C, 61.65; H, 5.88; N, 9.46.

EXAMPLE 5

$N^\alpha$-benzoyl-$N^G$,$N^G$-dibenzyloxycarbonyl-L-arginine, lithium salt

To 200 ml. of N,N-dimethylformamide were added 27.8 g. (0.1 mole) of $N^\alpha$-benzoyl-L-arginine and 80.0 g. (0.2 mole) of benzyl pentachlorophenylcarbonate. The resulting suspension was stirred and heated to 60°C. N-Trimethylsylylacetamide (52.4 g.; 0.4 mole) was added, and the reaction mixture was stirred at 60°C. for 48 hours.

About 5 ml. of water were added to the reaction mixture, and the N,N-dimethylformamide was evaporated in vacuo. The resulting oily residue was added to a hot solution of 21 g. of lithium acetate in 100 ml. of ethanol. The resulting solution was cooled overnight during which time a precipitate formed. The precipitate was collected by filtration, recrystallized from methanol, and dried to afford 27.5 g. (50% yield) of the title compound, melting point 207°–209°C. $[\alpha]_D^{25}$+20.0 (c. 1.5, N,N-dimethylformamide).

Analysis, Calcd. for $C_{29}J_{29}N_4O_7Li$: (M.W. 552.49): C, 63.03; H, 5.29; N, 10.14

Found: C. 62.80; H, 5.13; N, 10.29.

EXAMPLE 6

$N^\alpha$-benzoyl-$N^G$,$N^G$-dibenzyloxycarbonyl-L-arginine $N^\alpha$-benzoyl-$N^G$,$N^G$-dibenzyloxycarbonyl-L-arginine, lithium salt (12.0 g.; 0.0218 mole), was suspended in chloroform, and the mixture was neutralized by addition of 0.75 N aqueous citric acid. The chloroform layer was separated and extracted with water, dried over magnesium sulfate, and concentrated in vacuo. Ether was added to the residue, and the mixture was maintained at −20°C. during which time a precipitate formed. The precipitate was collected and dried in vacuo to afford 9.8 g. (83% yield) of the title compound, melting point 172°–173°C. $[\alpha]_D^{25}$+28.3 (c. 1.5, CHCl$_3$).

Analysis, Calcd. for $C_{29}H_{30}N_4O_7$ (M.W. 546.58): C, 63.73; H, 5.53; N, 10.25

Found: C, 63.59; H, 5.25; N, 10.07.

I claim:

1. A process for preparing a protected arginine of the formula

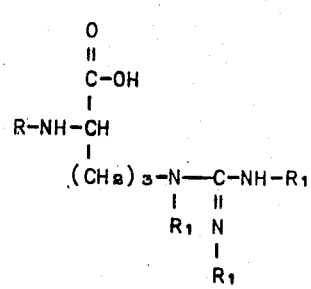

in which R is benzyloxycarbonyl, benzoyl, p-methoxybenzyloxycarbonyl, p-nitrobenzyloxycarbonyl, or t-butoxycarbonyl, and one $R_1$ is hydrogen and the other two are benzyloxycarbonyl or p-methoxybenzyloxycarbonyl, which comprises (a) treating an arginine of the formula

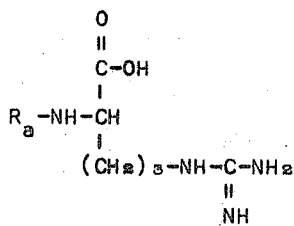

in which $R_a$ is hydrogen, benzyloxycarbonyl, benzoyl, p-methoxybenzyloxycarbonyl, p-nitrobenzyloxycarbonyl, or t-butoxycarbonyl, in an N,N-disubstituted amide solvent with a compound of the formula

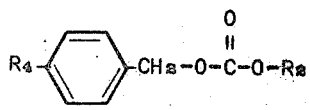

in which $R_2$ is pentachlorophenyl, 2,4,5-trichlorophenyl, or p-nitrophenyl, and $R_4$ is hydrogen or methoxy, at a temperature of from about 40°C. to about 90°C. for from about 12 to about 72 hours and in the presence of a silyl-amide and (b) treating the resulting $N^G$-protected arginine derivative with at least about 4 molar equivalents of a lithium salt of an acid having a pK of from about 4 to about 6 in the presence of an alcohol of the formula $R_3OH$ in which $R_3$ is a $C_1$ to $C_6$ alkyl to produce said protected arginine in the form of its lithium salt.

2. Process of claim 1, in which the arginine is treated with the carbonate and the silylating amide at a temperature of from about 60°C. to about 65°C.

3. Process of claim 2, in which $R_2$ is pentachlorophenyl and $R_4$ is hydrogen.

4. Process of claim 3, in which the silylating amide is N-trimethylsilylacetamide or N,O-bis-trimethylsilylacetamide.

5. Process of claim 4, in which the silylating amide is N-trimethylsilylacetamide.

6. Process of claim 5, in which the lithium salt is lithium acetate.

7. Process of claim 6, in which $R_3OH$ is methanol or ethanol, and the reaction mixture containing the lithium acetate and the alcohol is treated at a temperature of from about 60°C. to about 80°C.

8. Process of claim 7, in which $R_a$ is hydrogen, and the product is $N^\alpha,N^G,N^G$-tribenzyloxycarbonyl-L-arginine produced in the form of its lithium salt.

* * * * *